United States Patent
Benhase et al.

(10) Patent No.: US 7,568,121 B2
(45) Date of Patent: Jul. 28, 2009

(54) RECOVERY FROM FAILURE IN DATA STORAGE SYSTEMS

(75) Inventors: Michael Thomas Benhase, Tucson, AZ (US); Matthew Joseph Kalos, Tucson, AZ (US); Karl Allen Nielsen, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 10/991,110

(22) Filed: Nov. 16, 2004

(65) Prior Publication Data

US 2006/0107004 A1 May 18, 2006

(51) Int. Cl.
*G06F 11/00* (2006.01)
*G06F 15/167* (2006.01)

(52) U.S. Cl. .................. 714/5; 714/4; 714/43; 709/216
(58) Field of Classification Search .............. 714/4, 714/5, 7, 9, 42, 43; 709/212, 213, 216
See application file for complete search history.

(56) References Cited

U.S. PATENT DOCUMENTS

| | | | |
|---|---|---|---|
| 5,768,623 A * | 6/1998 | Judd et al. ............. | 710/37 |
| 5,948,108 A * | 9/1999 | Lu et al. ............. | 714/4 |
| 6,594,712 B1 * | 7/2003 | Pettey et al. ............. | 710/22 |
| 7,293,196 B2 * | 11/2007 | Hicken et al. ............. | 714/11 |
| 7,305,591 B2 * | 12/2007 | Do et al. ............. | 714/43 |
| 7,380,163 B2 * | 5/2008 | Davies et al. ............. | 714/9 |
| 7,401,260 B2 * | 7/2008 | Bomhoff et al. ............. | 714/42 |
| 2003/0105931 A1 * | 6/2003 | Weber et al. ............. | 711/162 |
| 2005/0193230 A1 * | 9/2005 | Springer et al. ............. | 714/5 |
| 2006/0045005 A1 * | 3/2006 | Blackmore et al. ............. | 370/216 |

\* cited by examiner

*Primary Examiner*—Joshua A Lohn
(74) *Attorney, Agent, or Firm*—Rabindranath Dutta; Konrad Raynes & Victor LLP

(57) ABSTRACT

Provided are a method, system, and article of manufacture, wherein a command is received at a first computational device coupled to a first adapter that is capable of allowing access to a data storage to the first computational device. The first computational device sends the command to a second computational device. The command is processed by a second adapter coupled to the second computational device, wherein the second adapter allows the second computational device to access the data storage, and wherein the second adapter accesses memory in the first computational device to process the command. In certain embodiments, the first adapter that allows the first computational device to access the data storage has failed.

36 Claims, 7 Drawing Sheets

RECOVERY FROM FAILURE IN DATA STORAGE SYSTEMS

BACKGROUND

1. Field

The disclosure relates to a method, system, and article of manufacture for recovery from a failure of an adapter in a data storage system.

2. Background

In certain data storage environments a plurality of servers may provide access to a storage device, where each server is coupled to the storage device via an adapter. For example, in a dual server data storage environment, each of two servers may have an adapter that provides access to the disk drives of a shared storage device. A first server may control a first adapter to access the disk drives, and a second server may control a second adapter to access the disk drives. The data storage environment provides redundancy by allowing host systems to access data stored in the disk drives through either or both of two servers.

In the event of a failure of an adapter, the server that controls the adapter may not be able to access the disk drives. For example, in case of a failure of the first adapter the first server may lose access to the disk drives. The redundancy provided by the data storage environment may allow host systems to access the disk drives by using the second server, where the second server uses the second adapter to access the disk drives and process commands from the host. However, the first server may not be used until the first adapter is operational once again.

SUMMARY OF THE DESCRIBED EMBODIMENTS

Provided are a method, system, and article of manufacture, wherein a command is received at a first computational device coupled to a first adapter that is capable of allowing access to a data storage to the first computational device. The first computational device sends the command to a second computational device. The command is processed by a second adapter coupled to the second computational device, wherein the second adapter allows the second computational device to access the data storage, and wherein the second adapter accesses memory in the first computational device to process the command. In certain embodiments, the first adapter that allows the first computational device to access the data storage has failed.

In further embodiments, the first computational device and the second computational device provide redundancy to a host that generates the command.

In additional embodiments, processing the command by the second adapter further comprises performing a direct memory access of the memory in the first computational device to execute the command. A completion notification is sent to the second computational device for forwarding to the first computational device. A command status word is written to indicate completion of execution of the command, to the memory of the first computational device.

In yet additional embodiments, the first computational device receives the completion notification from the second computational device before the command status word is written to the memory of the first computational device.

In further embodiments, a first path length between the second adapter and the first computational device is different from a second path length between the second computational device and the first computational device.

In additional embodiments, the first computational device determines that the command has been executed based on a receipt of both the completion notification and the command status word indicating the completion.

In further embodiments, the first and the second adapters are capable of performing direct memory access operations on the memory of the first computational device and memory of the second computational device, wherein the second adapter accesses the memory of the first computational device via the direct memory access operations.

In yet further embodiments, the second adapter generates a result in response to processing the command, and communicates the result to the first computational device. The first computational device sends the result to a host from which the command was received by the first computational device.

In still further embodiments, the first computational device generates data and control information for executing the command. The data and the control information are stored in the memory of the first computational device. The stored data and the stored control information are accessing via direct memory access of the memory by the second adapter.

In yet additional embodiments, a sender of the command is able to use both the first computational device and the second computational device to initiate an execution of the command even though the first adapter has failed.

In still further embodiments, a result of processing the command by the second adapter is equivalent to the result of processing the command by the first adapter that has currently failed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
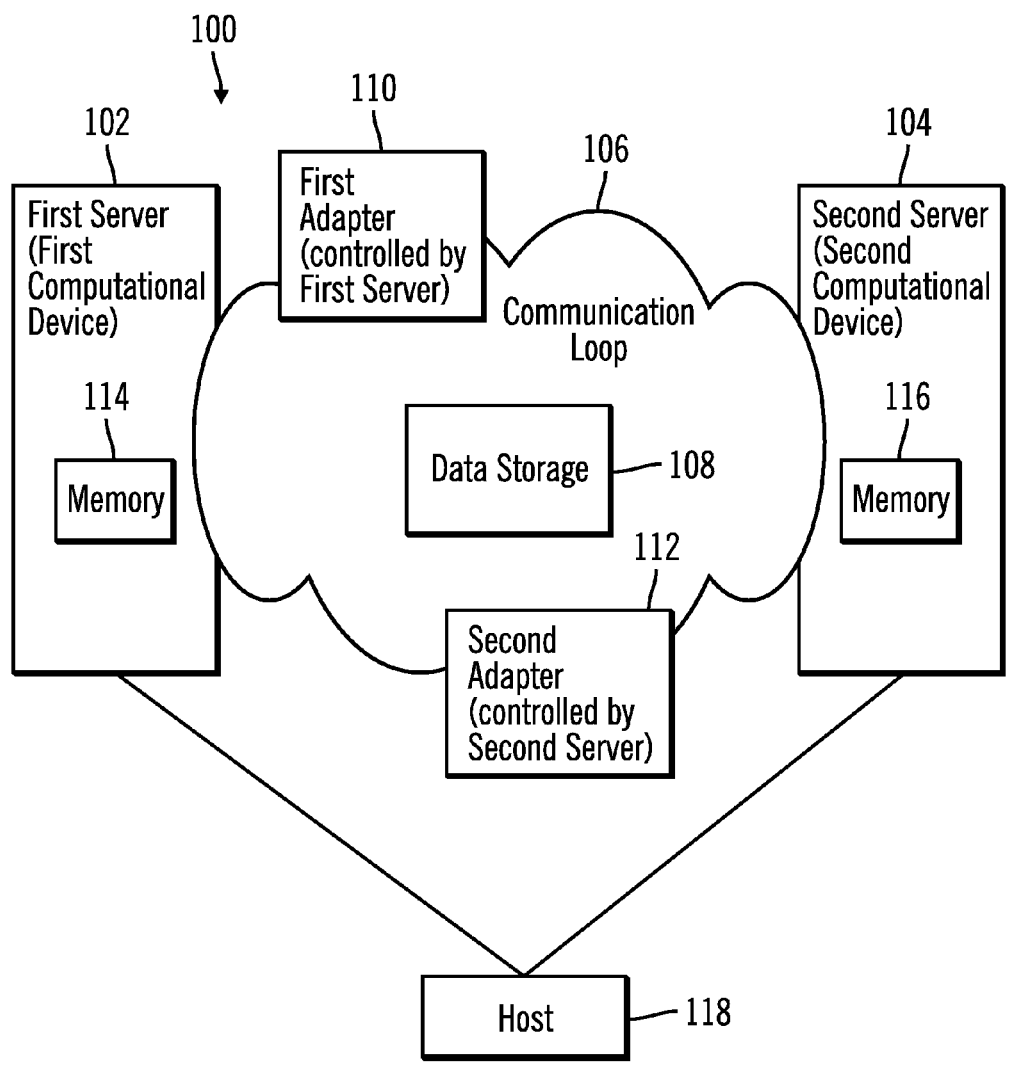
FIG. 1 illustrates a block diagram of a computing environment in accordance with certain embodiments.

FIG. 1 illustrates a block diagram of a computing environment 100 in accordance with certain embodiments. The computing environment 100 includes a first server 102 coupled to a second server 104 over a communication loop 106.

The first server 102 and the second server 104 may comprise any suitable computational device including those presently known in the art, such as, a personal computer, a workstation, a mainframe, a hand held computer, a palm top computer, a telephony device, a network appliance, a blade computer, a storage server, etc. The communication loop 106 may include any suitable network including those presently known in the art, such as, a storage area network (SAN), a local area network (LAN), an Intranet, etc.

The communication loop 106 includes data storage 108, a first adapter 110, and a second adapter 112. The data storage 108 may include any suitable data storage including those presently known in the art, such as disk drives, tape drives, etc. The first adapter 110 is capable of being controlled by the first server 102 and provides access to the data storage 108 to the first server 102. The second adapter 112 is capable of being controlled by the second server 104 and provides access to the data storage 108 to the second server 104.

The first server 102 includes memory 114 and the second server includes memory 116, where the memory may include random access memory. In certain embodiments, the first adapter 110 and the second adapter 112 are capable of performing direct memory access to the memory 114, 116 in the servers 102, 104. Therefore, in the computing environment 100 both adapters 110, 112 can access the data storage 108 and the memory 114, 116 in both servers 102, 104.

A host 118 may send commands for execution to either or both of the servers 102 and 104. The execution of the commands may require input/output (I/O) operations with respect to the data storage 108. The servers 102, 104 may execute the commands by accessing the data storage 108. Having two servers 104, 104 may provide redundancy in the execution of the commands to the host 118.

FIG. 1 illustrates certain embodiments in which in a dual server data storage environment 100, a data storage 108 is accessed by a first server 102 via a first adapter 110, and is also accessed by a second server 104 via a second adapter 112. In alternative embodiments, there may be more than two servers and there may be more than two adapters. While two adapters and one data storage are shown in FIG. 1, in alternative embodiments there may be more than two adapters and more than one data storage.

Figure 2:
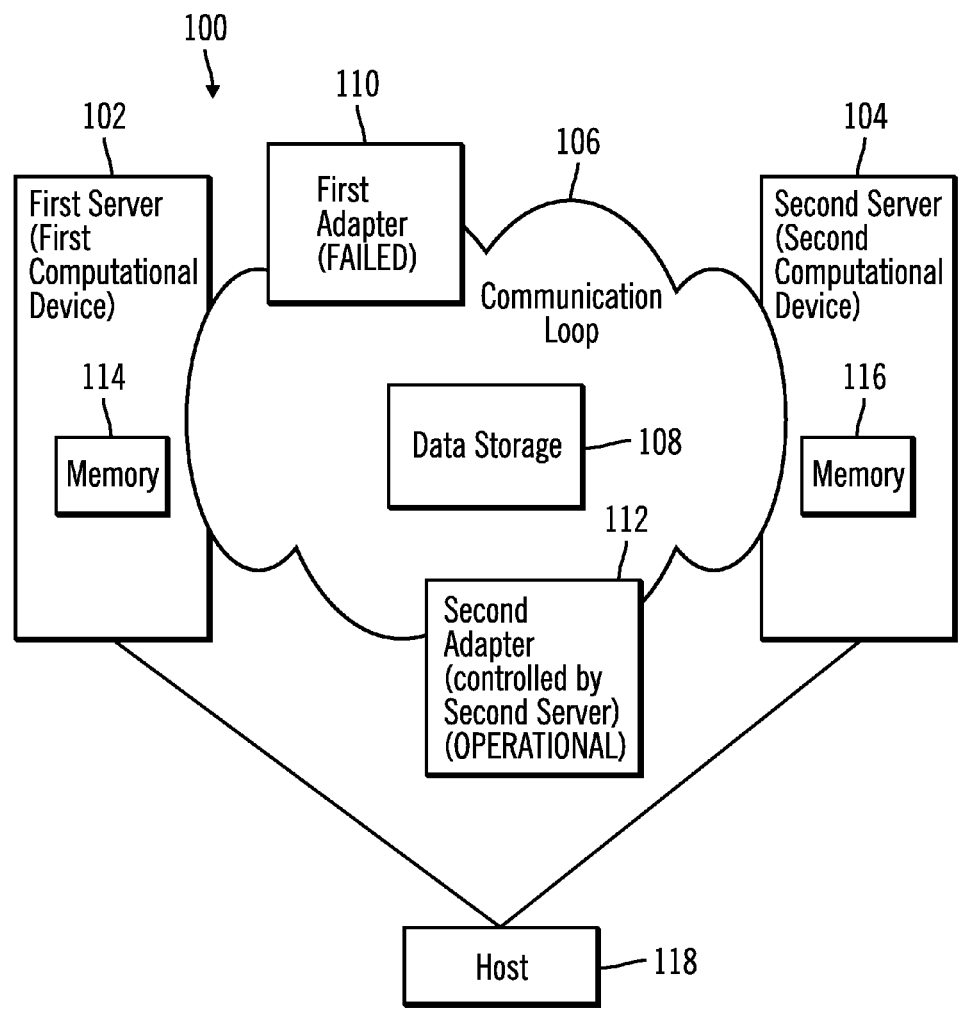
FIG. 2 illustrates a block diagram that shows a failure of an adapter in the computing environment, in a accordance with certain embodiments.

FIG. 2 illustrates a block diagram that shows a failure of a first adapter 110 in the computing environment 100, in a accordance with certain embodiments. While FIG. 2 shows the first adapter 110 as having failed, in alterative embodiments the second adapter 112 may fail and the first adapter 110 may be operational.

The failure of the first adapter 110 may be caused by a variety of reasons, including, a hardware failure, a software error, an adapter reset, etc. In case of a failure of the first adapter 110, the first server 102 is unable to access the data storage 108 via the first adapter 110. Similarly, in alternative embodiments in case of a failure of the second adapter 112, the second server 104 is unable to access the data storage 108 via the second adapter 112.

If the host 118 were to wait for the failed first adapter 110 to become operational, the waiting would be successful only in the case of temporary adapter problems, such as those cause via an adapter reset, etc. The waiting could take a substantial period of time and may be unsuitable for the execution of certain commands that are generated by the host 118. Additionally, if the host 118 were to wait for the failed first adapter 110 to become operational, the waiting would not be successful in the case of permanent adapter problems, such as adapter problems caused by a failure of the hardware of the adapter. Certain embodiments, provide a mechanism in which the system can tolerate both temporary and permanent failures of an adapter.

In the event of a failure of the first adapter 110, the host 118 could stop sending commands to the first server 102 and send all commands to the second server 104 for execution. All access to the data storage 108 would be via the second server 104 that controls the operational second adapter 112. However, in such a case all I/O must be processed through a single server. The redundancy that was gained by using the dual server environment 100 is not longer available. Additionally, when one of the adapters fail, then the read/write caching provided by the server that controls the failed adapter may not be available, and the performance of the system may suffer a degradation.

Certain embodiments, allow the use of both the first server 102 and the second server 104 even in the event of a failure of an adapter, such as the first adapter 110. As a result, the redundancy provided by the dual server environment 100 is exploited by certain embodiments.

FIG. 2 illustrates an embodiment in which even in the event of a failure of an adapter, such as the first adapter 110, the host 118 continues to use both the first server 102 and the second server 104 to execute commands.

Figure 3:
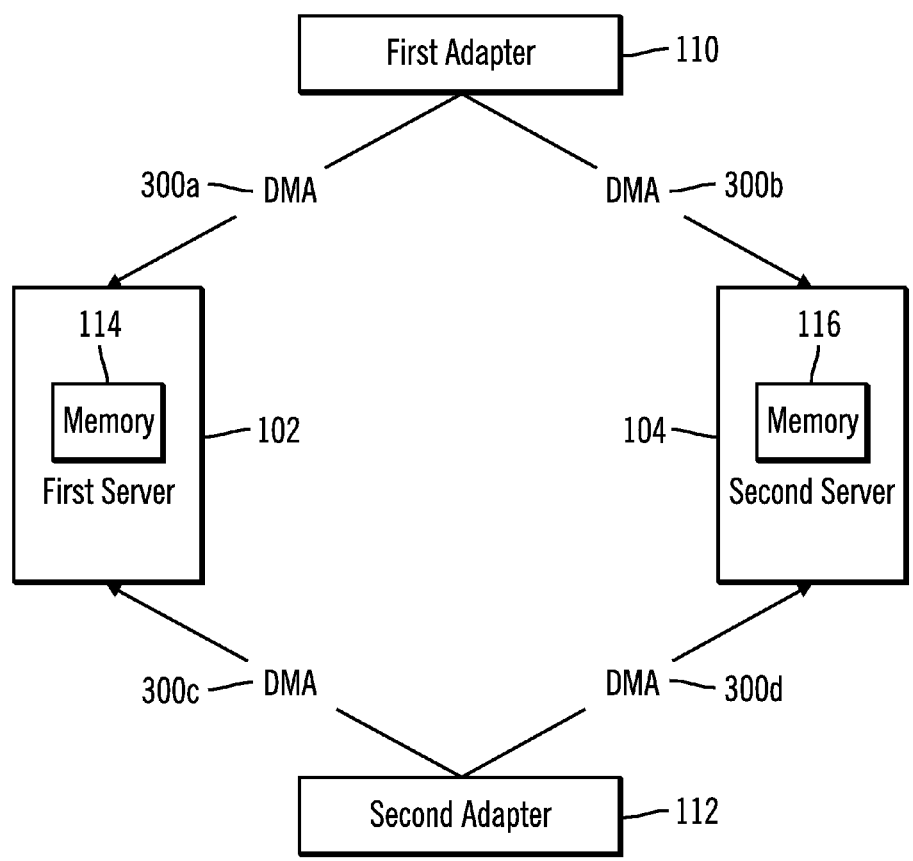
FIG. 3 illustrates a block diagram that shows how adapters are capable of performing direct memory access to servers, in accordance with certain embodiments.

FIG. 3 illustrates a block diagram that shows how both adapters 110, 112 are capable of performing direct memory access (DMA) to both servers 102, 104, in accordance with certain embodiments. DMA is a facility of some computer architectures that allows a device to read and write to memory without the intervention of a central processing unit (CPU). In certain embodiments, DMA may be a limited form of bus mastering.

For example, in certain embodiments, the first adapter 110 is capable of performing a DMA 300a of the memory 114 of the first server 102, and a DMA 300b of the memory 116 of the second server 104. Additionally, the second adapter 112 is capable of performing a DMA 300c of the memory 114 of the first server 102, and a DMA 300d of the memory 116 of the second server 104.

FIG. 3 illustrates certain embodiments in which both adapters 110, 112 can perform a DMA to the memory 114, 116 of both servers 102, 104.

Figure 4:
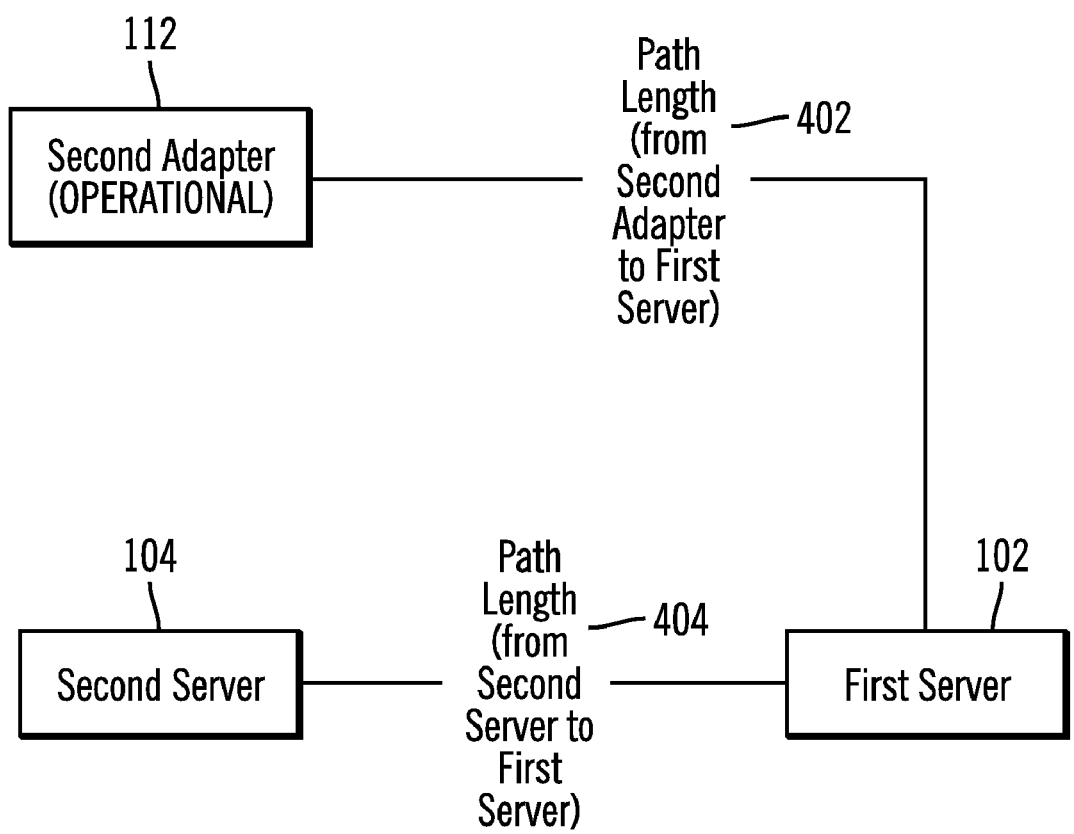
FIG. 4 illustrates a block diagram that shows different exemplary path lengths in the computing environment, in accordance with certain embodiments.

FIG. 4 illustrates a block diagram that shows different exemplary path lengths in the computing environment 100, in accordance with certain embodiments.

A path length between two elements coupled by the communication loop 106 may represent a proximity measure between the two elements, where in certain embodiments the proximity measure may be a factor of distance between the two elements. For example, FIG. 4 illustrates a path length 402 between the second adapter 112 and the first server 102, and a path length 404 between the second server 104 and the first server 102. In certain embodiments, the path length 402 and the path length 404 may be different. As a result, communications from the second adapter 112 to the first server 102 may take a different amount of time to complete than communications from the second server 104 to the first server 102.

For example, in certain embodiments where the path length 402 is greater than the path length 404, even if the second adapter 112 sends a first communication to the first server 102 before a second communication sent by the second server 104 to the first server 102, the second communication may reach the first server 102 before the first communication. Reasons other than differences in path length may also cause an out of order arrival of communications. For example, different degrees of contention or congestion in different paths may cause different communications to take a different amount of time to complete, and a first communication may be received earlier or later than a second communication.

FIG. 4 illustrates certain embodiments in which communications from the second adapter 112 and the second server 104 may reach the first server 102 in a different order than the order in which the communications are transmitted to the first server 102.

Figure 5:
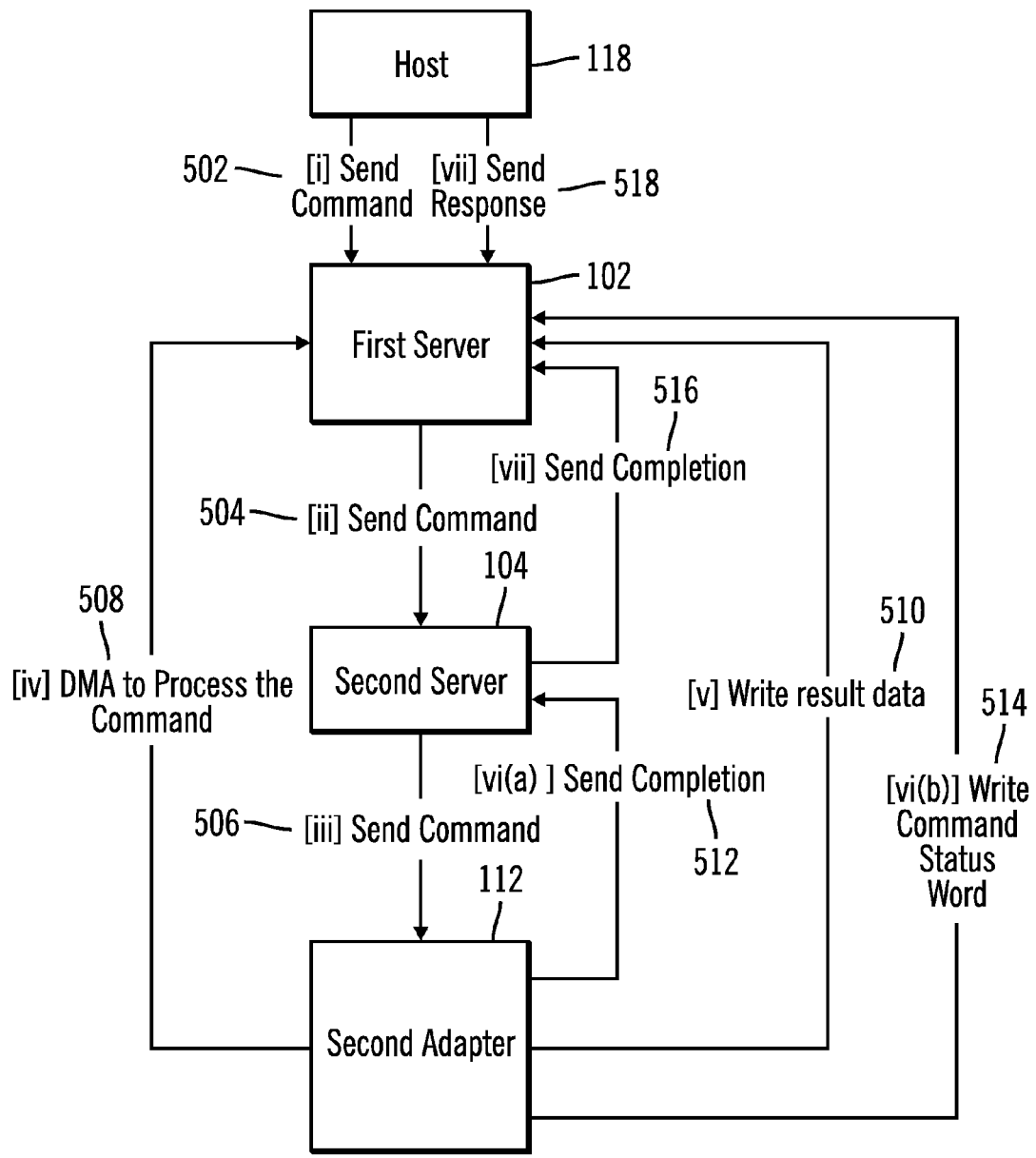
FIG. 5 illustrates a block diagram that shows how a recovery from failure is performed, in accordance with certain embodiments.

FIG. 5 illustrates a block diagram that shows how a recovery from failure is performed in the computing environment 100, in accordance with certain embodiments.

In certain embodiments, where the first adapter 110 has failed, certain embodiments allow the host 118 to execute commands via both the first server 102 and the second server 104, even though the first server 102 is no longer able to access the data storage 108 directly because of the failure of the first adapter 110. The second server 104 can of course execute commands sent by the host 118 because the second server 104 has access to the data storage 108 via the operational second adapter 112.

In certain embodiments, the host 118 may send a command (reference numeral 502) to the first server 102 for execution. The first server 102 is unable to use the failed first adapter 110 to access the data storage 108 for executing the command. In certain embodiments, the first server 102 sends (reference numeral 504) the command to the second server 104 over the communication loop 106.

The second server 104 can control the operational second adapter 112 and sends (reference numeral 506) the command to the second adapter 112. To execute the command, the second adapter 112 may require data and other information associated with the command that may be stored in the memory 114 of the first server 102. The second adapter 112 performs (reference numeral 508) a DMA on the memory 114 of the first server 102 to process the command and writes (reference numeral 510) the result that is generated to the first server 102.

The second adapter 112 sends (reference numeral 512) a completion notification to the second server 104 denoting the completion of the execution of the command in the second adapter 112. In certain embodiments, the second adapter 112 may simultaneously send (reference numeral 514) a command status word indicating a successful completion of the command to the first server 102, where the command status word is an indicator that indicates the completion of the execution of the command.

The second server 104 sends a completion notification (reference numeral 516) to the first server 102. In one embodiment, the path length between the second server 104 and the first server 102 may be different from the path length between the second adapter 112 and the first server 102, the first server 102 may receive the completion notification from the second server 104 before receiving the command status word that indicates successful completion of the command from the second adapter 112. In other embodiments, the out of order arrival of the completion notification when compared to the command status word may be caused by factors such as contention or congestion in the paths.

In certain embodiments, once the first server 102 has received the completion notification from the second server 104 and the command status word indicating completion from the second adapter 112 a conclusion can be drawn that the command from the host 118 has been processed. In certain alternative embodiments, the conclusion that the command from the host has been processed may be drawn just on the basis of the command status word from the second adapter 112. The first server 102 may send (reference numeral 518) a response to the host 118.

FIG. 5 illustrates an embodiment in which in even in the failure of a first adapter 110, the redundancy of the computing environment 100 is retained because both the first server 102 and the second server 104 are used to execute commands sent by the host 118. While the first server 102 cannot use the first adapter 110 to access the data storage 108, the first server 102 sends the command to the second server 104 for execution by the second adapter 112 via a DMA of the memory of the first server 102.

Figure 6:
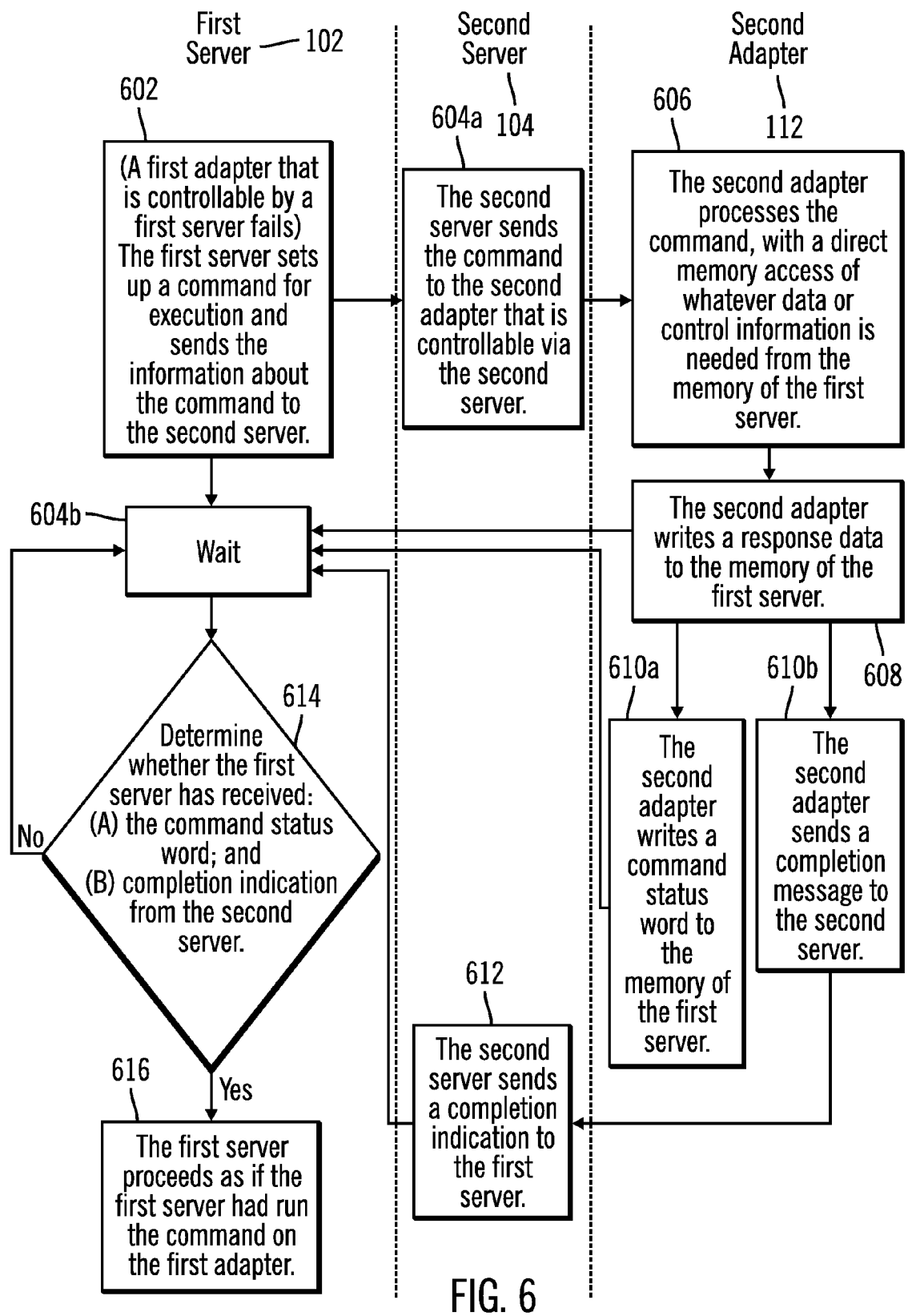
FIG. 6 illustrates operations for recovery from a failure of an adapter, in accordance with certain embodiments.

FIG. 6 illustrates operations for recovery from a failure of an adapter, such as the first adapter 102, in the computing environment 100, in accordance with certain embodiments.

Control starts at block 602, after a command is received by the first server 102 from the host 118 subsequent to the failure of the first adapter 110. The first server sets up the command for execution and sends (at block 602) the information about the command to the second server 104. Setting up the command for execution may include the generation of data and control information and storing the data and control information in the memory 114 of the first server 102, where the stored data and control information may subsequently be required in combination with data stored in the data storage 108 for a completion of the execution of the command. The first server 102 enters into a wait (block 604b) mode, waiting for the certain conditions to be satisfied.

The second server 104 receives the command from the first server and sends (at block 604a) the command to the second adapter 112 that is controllable via the second server 104. The second adapter 112 receives and processes (at block 606) the command, with a direct memory access of whatever data or control information that is needed from the memory 114 of the first server 102 for the processing of the command.

The second adapter 112 writes (at block 608) a response data comprising the result of the execution of the command to the memory 114 of the first server 102 via a DMA operation. The second adapter 112 then initiates the writing (at block 610a) of a command status word that indicates completion of the execution of the command to the memory 114 of the first server 102 via a DMA operation. The second adapter 112 may also initiate the sending (at block 610b) of a completion message to the second server 104, where the initiation of the sending of completion message may be performed in parallel with the writing of the command status word. On receiving the completion message the second server 104 forwards (at block 612) the completion message to the first server 102.

The first server 102 that is in a waiting mode (at block 604b) receives communications from the second server 104 and the second adapter 112, such as communications sent in blocks 608, 610a, 612. The first server 102 determines (at block 614) whether the first server 102 has received: (A) the command status word indicating completion of the execution of the command from the second adapter 112; and (B) a completion indication from the second server 104. In so, the first server 102 proceeds (at block 616) as if the first server 102 had run the command from the host 118 on the first adapter 110, even though the first adapter 110 has failed.

If at block 614, the first server 102 determines that the first server 102 has either not received the command status word indicating completion from the second adapter 112 or not received the completion indication from the second server 104, then the first server 102 continues (at block 604b) to wait and periodically executes block 614.

FIG. 6 illustrates an embodiment in which even in the case of a failure of an adapter, such as the first adapter 110, that provides access to the data storage 108 to a server, such as the first server 110, the server can be used by the host 118 to execute commands. The redundancy of the computing environment 100 is retained because both the first server 102 and the second server 104 are used to execute commands sent by the host 118 even when one of the adapters have failed.

Certain embodiments continue to provide redundancy in a dual server data storage environment by allowing the use of a server that cannot directly access a storage device because of a failure of the adapter that provides access to the server to the storage device. The server sends a message to another server whose adapter performs DMA operations to access the memory of the server whose adapter has failed. Hosts can continue sending command to all servers of a multiple server based data storage environment for execution even when an adapter for one of the servers has failed. Redundancy of servers in a multiple server based data storage environment is retained by certain embodiments even in the event of the failure of certain adapters.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 7:
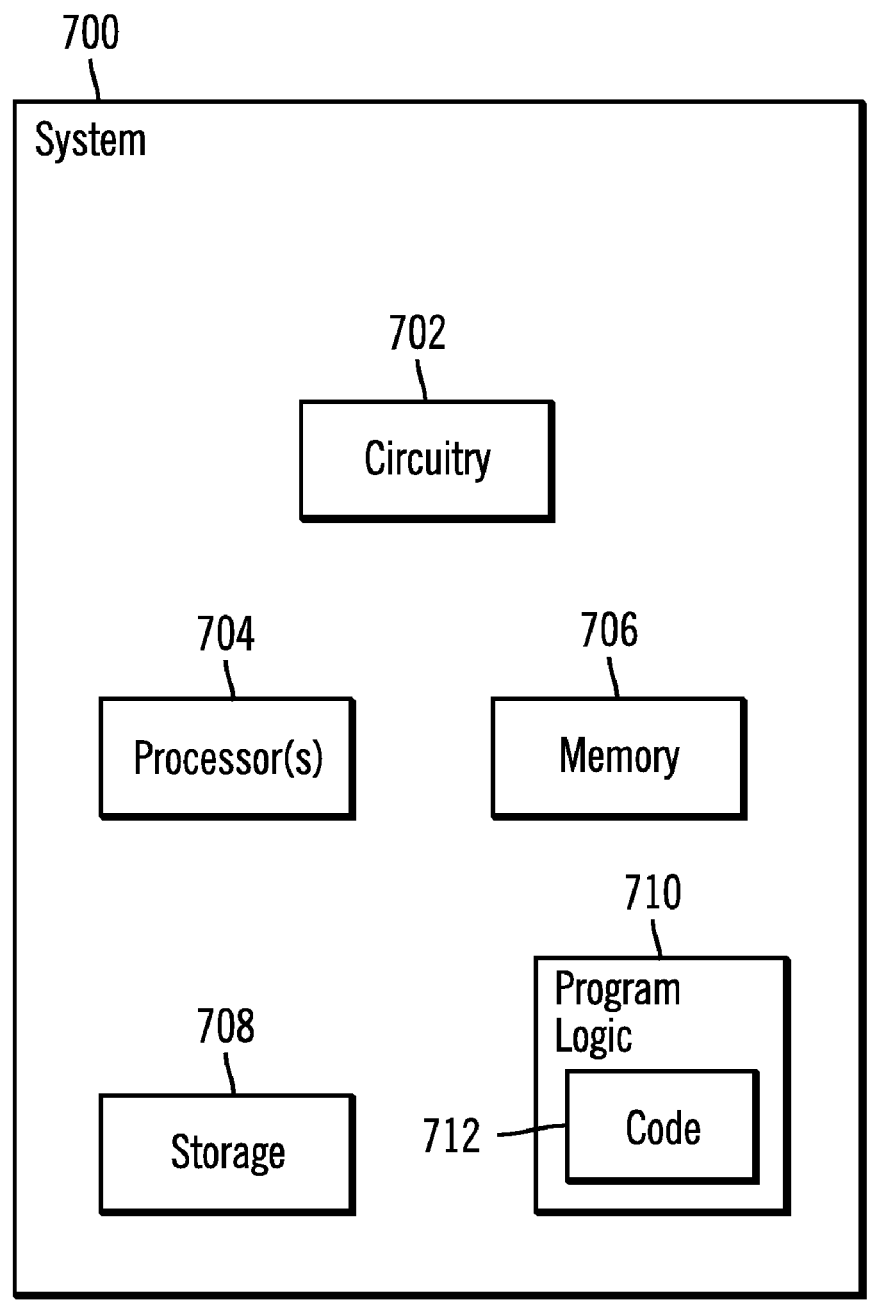
FIG. 7 illustrates a system in which certain embodiments are implemented.

FIG. 7 illustrates a block diagram of a system 700 in which certain embodiments may be implemented. In certain embodiments, the servers 102, 104 may be implemented in accordance with the system 700. The system 700 may include a circuitry 702 that may in certain embodiments include a processor 704. The system 700 may also include a memory 706 (e.g., a volatile memory device), and storage 708. Certain elements of the system 700 may or may not be found in the servers 102, 104. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

At least certain of the operations of FIG. 6 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

receiving a command at a first computational device coupled to a first adapter that is capable of allowing access to a data storage to the first computational device;

sending, by the first computational device, the command to a second computational device; and processing the command by a second adapter coupled to the second computational device, wherein the second adapter allows the second computational device to access the data storage, and wherein the second adapter accesses memory in the first computational device to process the command, wherein the first adapter that allows the first computational device to access the data storage has failed, and wherein the method further comprises:

generating, by the first computational device, data and control information for executing the command;

storing the data and the control information in the memory of the first computational device; and accessing the stored data and the stored control information via direct memory access of the memory by the second adapter.

2. The method of claim 1, wherein the first computational device and the second computational device provide redundancy to a host that generates the command.

3. The method of claim 1, wherein the first and the second adapters are capable of performing direct memory access operations on the memory of the first computational device and memory of the second computational device, and wherein the second adapter accesses the memory of the first computational device via the direct memory access operations.

4. The method of claim 1, further comprising:
generating, by the second adapter, a result in response to processing the command;
communicating the result to the first computational device; and
sending, by the first computational device, the result to a host from which the command was received by the first computational device.

5. The method of claim 1, wherein a sender of the command is able to use both the first computational device and the second computational device to initiate an execution of the command even though the first adapter has failed.

6. The method of claim 1, wherein a result of processing the command by the second adapter is equivalent to the result of processing the command by the first adapter that has currently failed.

7. A method, comprising:
receiving a command at a first computational device coupled to a first adapter that is capable of allowing access to a data storage to the first computational device;
sending, by the first computational device, the command to a second computational device; and
processing the command by a second adapter coupled to the second computational device, wherein the second adapter allows the second computational device to access the data storage, and wherein the second adapter accesses memory in the first computational device to process the command, wherein the first adapter that allows the first computational device to access the data storage has failed, wherein processing the command by the second adapter further comprises:
performing a direct memory access of the memory in the first computational device to execute the command;
sending a completion notification to the second computational device for forwarding to the first computational device; and
writing a command status word indicating completion of execution of the command to the memory of the first computational device; and wherein:
the first computational device receives the completion notification from the second computational device before the command status word is written to the memory of the first computational device.

8. The method of claim 7, wherein a first path length between the second adapter and the first computational device is different from a second path length between the second computational device and the first computational device.

9. The method of claim 7, wherein the first computational device determines that the command has been executed based on a receipt of both the completion notification and the command status word indicating the completion.

10. A system, comprising:
a data storage;
a first computational device having memory;
a first adapter coupled to the first computational device, wherein the first adapter is capable of allowing access to the data storage to the first computational device;
a second computational device; and
a second adapter coupled to the second computational device, wherein the second adapter allows the second computational device to access the data storage, wherein the first computational device receives a command, wherein the first computational device sends the command to the second computational device, and wherein the second adapter processes the command by accessing the memory in the first computational device, wherein the first adapter that allows the first computational device to access the data storage has failed, wherein the first computational device generates data and control information for executing the command, wherein the data and the control information is stored in the memory of the first computational device, and wherein the second adapter accesses the stored data and the stored control information via direct memory access of the memory of the first computational device.

11. The system of claim 10, wherein the first computational device and the second computational device provide redundancy to a host that generates the command.

12. The system of claim 10, wherein the first and the second adapters are capable of performing direct memory access operations on the memory of the first computational device and memory of the second computational device, and wherein the second adapter accesses the memory of the first computational device via the direct memory access operations.

13. The system of claim 10, wherein the second adapter generates a result in response to processing the command, wherein the result is communicated to the first computational device, and wherein the first computational device sends the result to a host from which the command was received by the first computational device.

14. The system of claim 10, wherein a sender of the command is able to use both the first computational device and the second computational device to initiate an execution of the command even though the first adapter has failed.

15. The system of claim 10, wherein a result of processing the command by the second adapter is equivalent to the result of processing the command by the first adapter that has currently failed.

16. A system, comprising:
a data storage;
a first computational device having memory;
a first adapter coupled to the first computational device, wherein the first adapter is capable of allowing access to the data storage to the first computational device;
a second computational device; and
a second adapter coupled to the second computational device, wherein the second adapter allows the second computational device to access the data storage, wherein the first computational device receives a command, wherein the first computational device sends the command to the second computational device, and wherein the second adapter processes the command by accessing the memory in the first computational device, wherein the first adapter that allows the first computational device to access the data storage has failed, wherein processing the command by the second adapter further comprises:
performing a direct memory access of the memory in the first computational device to execute the command;
sending a completion notification to the second computational device for forwarding to the first computational device; and
writing a command status word indicating completion of execution of the command to the memory of the first computational device; and
wherein the first computational device receives the completion notification from the second computational device before the command status word is written to the memory of the first computational device.

17. The system of claim 16, wherein a first path length between the second adapter and the first computational device is different from a second path length between the second computational device and the first computational device.

18. The system of claim 16, wherein the first computational device determines that the command has been executed based on a receipt of both the completion notification and the command status word indicating the completion.

19. A computer readable storage medium, wherein code stored in the computer readable storage medium when executed by a processor causes operations, the operations comprising:
   receiving a command at a first computational device coupled to a first adapter that is capable of allowing access to a data storage to the first computational device;
   sending, by the first computational device, the command to a second computational device; and
   processing the command by a second adapter coupled to the second computational device, wherein the second adapter allows the second computational device to access the data storage, and wherein the second adapter accesses memory in the first computational device to process the command, wherein the first adapter that allows the first computational device to access the data storage has failed, the operations further comprising:
      generating, by the first computational device, data and control information for executing the command;
      storing the data and the control information in the memory of the first computational device; and
      accessing the stored data and the stored control information via direct memory access of the memory by the second adapter.

20. The article of manufacture of claim 19, wherein the first computational device and the second computational device provide redundancy to a host that generates the command.

21. The computer readable storage medium of claim 19, wherein the first and the second adapters are capable of performing direct memory access operations on the memory of the first computational device and memory of the second computational device, and wherein the second adapter accesses the memory of the first computational device via the direct memory access operations.

22. The computer readable storage medium of claim 19, the operations further comprising:
   generating, by the second adapter, a result in response to processing the command;
   communicating the result to the first computational device; and
   sending, by the first computational device, the result to a host from which the command was received by the first computational device.

23. The computer readable storage medium of claim 19, wherein a sender of the command is able to use both the first computational device and the second computational device to initiate an execution of the command even though the first adapter has failed.

24. The readable storage medium 19, wherein a result of processing the command by the second adapter is equivalent to the result of processing the command by the first adapter that has currently failed.

25. A computer readable storage medium, wherein code stored in the computer readable storage medium when executed by a processor causes operations, the operations comprising:
   receiving a command at a first computational device coupled to a first adapter that is capable of allowing access to a data storage to the first computational device;
   sending, by the first computational device, the command to a second computational device;
   processing the command by a second adapter coupled to the second computational device, wherein the second adapter allows the second computational device to access the data storage, and wherein the second adapter accesses memory in the first computational device to process the command, wherein the first adapter that allows the first computational device to access the data storage has failed, wherein processing the command by the second adapter further comprises:
      performing a direct memory access of the memory in the first computational device to execute the command;
      sending a completion notification to the second computational device for forwarding to the first computational device; and
      writing a command status word indicating completion of execution of the command to the memory of the first computational device; and
   wherein the first computational device receives the completion notification from the second computational device before the command status word is written to the memory of the first computational device.

26. The computer readable storage medium of claim 25, wherein a first path length between the second adapter and the first computational device is different from a second path length between the second computational device and the first computational device.

27. The computer readable storage medium of claim 25, wherein the first computational device determines that the command has been executed based on a receipt of both the completion notification and the command status word indicating the completion.

28. A method for deploying computing infrastructure, comprising integrating computer-readable code into a computing system, wherein the code in combination with the computing system is capable of performing:
   receiving a command at a first computational device coupled to a first adapter that is capable of allowing access to a data storage to the first computational device;
   sending, by the first computational device, the command to a second computational device; and
   processing the command by a second adapter coupled to the second computational device, wherein the second adapter allows the second computational device to access the data storage, and wherein the second adapter accesses memory in the first computational device to process the command, wherein the first adapter that allows the first computational device to access the data storage has failed, and wherein the code in combination with the computing system is further capable of performing:
      generating, by the first computational device, data and control information for executing the command;
      storing the data and the control information in the memory of the first computational device; and
      accessing the stored data and the stored control information via direct memory access of the memory by the second adapter.

29. The method for deploying computing infrastructure of claim 28, wherein the first computational device and the second computational device provide redundancy to a host that generates the command.

30. The method for deploying computing infrastructure of claim 28, wherein the first and the second adapters are capable of performing direct memory access operations on the memory of the first computational device and memory of the second computational device, and wherein the second adapter accesses the memory of the first computational device via the direct memory access operations.

31. The method for deploying computing infrastructure of claim 28, wherein the code in combination with the computing system is further capable of performing:

generating, by the second adapter, a result in response to processing the command;

communicating the result to the first computational device; and sending, by the first computational device, the result to a host from which the command was received by the first computational device.

32. The method for deploying computing infrastructure of claim 28, wherein a sender of the command is able to use both the first computational device and the second computational device to initiate an execution of the command even though the first adapter has failed.

33. The method for deploying computing infrastructure of claim 28, wherein a result of processing the command by the second adapter is equivalent to the result of processing the command by the first adapter that has currently failed.

34. A method for deploying computing infrastructure, comprising integrating computer-readable code into a computing system, wherein the code in combination with the computing system is capable of performing:

receiving a command at a first computational device coupled to a first adapter that is capable of allowing access to a data storage to the first computational device;

sending, by the first computational device, the command to a second computational device; and processing the command by a second adapter coupled to the second computational device, wherein the second adapter allows the second computational device to access the data storage, and wherein the second adapter accesses memory in the first computational device to process the command, wherein the first adapter that allows the first computational device to access the data storage has failed, wherein processing the command by the second adapter further comprises:

performing a direct memory access of the memory in the first computational device to execute the command;

sending a completion notification to the second computational device for forwarding to the first computational device; and writing a command status word indicating completion of execution of the command to the memory of the first computational device; and wherein:

the first computational device receives the completion notification from the second computational device before the command status word is written to the memory of the first computational device.

35. The method for deploying computing infrastructure of claim 34, wherein a first path length between the second adapter and the first computational device is different from a second path length between the second computational device and the first computational device.

36. The method for deploying computing infrastructure of claim 34, wherein the first computational device determines that the command has been executed based on a receipt of both the completion notification and the command status word indicating the completion.

* * * * *